United States Patent
Karmarkar

(10) Patent No.: US 8,489,131 B2
(45) Date of Patent: *Jul. 16, 2013

(54) SMART DEVICE CONFIGURED TO DETERMINE HIGHER-ORDER CONTEXT DATA

(75) Inventor: Amit Karmarkar, Palo Alto, CA (US)

(73) Assignee: Buckyball Mobile Inc., Palo Alto, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 12/643,090

(22) Filed: Dec. 21, 2009

(65) Prior Publication Data

US 2011/0154363 A1    Jun. 23, 2011

(51) Int. Cl.
*H04W 4/14*    (2009.01)

(52) U.S. Cl.
USPC ............... 455/466; 455/9; 455/461; 455/457; 455/459; 455/456.1; 370/328; 370/349; 340/988; 340/995.12

(58) Field of Classification Search
USPC .............. 455/455, 461, 466, 457, 459, 456.1, 455/9; 370/328, 349; 340/988, 995.12
See application file for complete search history.

(56) References Cited

U.S. PATENT DOCUMENTS

| | | | |
|---|---|---|---|
| 8,166,168 B2 * | 4/2012 | Hayashi et al. | 709/226 |
| 2004/0192353 A1 * | 9/2004 | Mason et al. | 455/457 |
| 2004/0243941 A1 * | 12/2004 | Fish | 715/752 |
| 2005/0184875 A1 * | 8/2005 | Schmandt et al. | 340/573.1 |
| 2005/0245241 A1 * | 11/2005 | Durand et al. | 455/414.1 |
| 2005/0250440 A1 * | 11/2005 | Zhou et al. | 455/12.1 |
| 2006/0224459 A1 * | 10/2006 | Aramaki et al. | 705/22 |

FOREIGN PATENT DOCUMENTS

WO    WO 03037007 A1 *    5/2003

* cited by examiner

*Primary Examiner* — Lester Kincaid
*Assistant Examiner* — Diego Herrera

(57) ABSTRACT

Disclosed are a method, system and apparatus of a smart device configured to determine higher-order context data. In one aspect, an apparatus includes a sensor to acquire a context data. The context data provides information of an attribute of an event within the range of the sensor. A processor analyzes an attribute of the context data and determines a higher-order context data. A message generator generates a supplemental context message transmittable through a network. The supplemental context message includes the higher-order context data. A network interface device communicatively couples the apparatus to the network.

10 Claims, 9 Drawing Sheets

SMART DEVICE CONFIGURED TO DETERMINE HIGHER-ORDER CONTEXT DATA

FIELD OF TECHNOLOGY

Claim of Priority

This application is a Continuation-in-part of and claims priority to patent application Ser. No. 12/579,832 filed on Oct. 15, 2009 which is a Continuation-in-part of and claims priority to patent application Ser. No. 12/422,313 filed on Apr. 13, 2009 which claims priority from Provisional Application 61/161,763 filed on Mar., 19, 2009, which is a Continuation-in-part of Ser. No. 11/519,600 filed Sep. 11, 2006, which was patented as U.S. Pat. No. 7,551,935, which is a Continuation-in-part of Ser. No. 11/231,575 filed Sep. 21, 2005 which was patented as U.S. Pat. No. 7,580,719.

This application is also a Continuation-in-part of and claims priority to patent application Ser. No. 12/422,313 filed on Apr. 13, 2009 which claims priority from Provisional Application 61/161,763 filed on Mar., 19, 2009, which is a Continuation-in-part of Ser. No. 11/519,600 filed Sep. 11, 2006, which was patented as U.S. Pat. No. 7,551,935, which is a Continuation-in-part of Ser. No. 11/231,575 filed Sep. 21, 2005 which was patented as U.S. Pat. No. 7,580,719.

This application further claims the benefit of U.S. Provisional Application No. 61/264,479, filed Nov. 25, 2009.

BACKGROUND

A user may desire more information about a system. The system may include sensors to measure the properties of the system's components and/or the system's physical environment. The measured properties may be converted into a signal by a sensor. The sensor may transmit the signal to a user's computer. The signal may include measurements of the properties as acquired by the sensor. However, the sensor may not provide any reference as to the meaning of the measurement.

Furthermore, other sensors may also monitor the system. The information acquired by the other sensors may not include information as to how the measurements relate to each other. Consequently, valuable information about the system may be absent.

SUMMARY

A system, method, and article of manufacture of a smart device configured to determine higher-order context data are disclosed. In one aspect, an apparatus includes a sensor to acquire a context data. The context data provides information of an attribute of an event within the range of the sensor. A processor analyzes an attribute of the context data and determines a higher-order context data. A message generator generates a supplemental context message transmittable through a network. The supplemental context message includes the higher-order context data. A network interface device communicatively couples the apparatus to the network.

In addition, the supplemental context message may include a text message identifying the apparatus with a pronoun. The supplemental context message may provide a hyperlink with the pronoun as a hyperlink anchor to a target document providing further information of the apparatus and the context data. In addition, the supplemental context message may instruct a microblogging server to post the supplemental context message as a microblog post. A database may store the context data and a higher-order context data.

In another aspect, a system for producing a supplemental context-data signal is disclosed. The system includes a sensing device to acquire and decode a first signal comprising a context data. A processor to process the first signal in order to determine an interpretation of the context data. The processor also provides an instruction to a signal generator to create a second signal comprising the interpretation of the context data. A signal generator to create the second signal comprising the interpretation of the context data.

In addition, the processor may be programmed to utilize a syntactic pattern recognition algorithm to determine the interpretation of the first signal. The second signal may comprise a text message or a microblog post. The text message may refer to the system with a pronoun.

In yet another aspect, a set of application program interfaces embodied on a computer-readable medium for execution on a computer in conjunction with an application program that provides a supplemental context data to an application are disclosed. A first interface receives a status request from the application. The status request comprises a query about an attribute of an event acquired by a sensor. The sensor is communicatively coupled with a processor running the set of application program interfaces. A second interface returns the supplemental context data comprising an interpretation of the attribute of the event to the application according to a communication standard utilized by the application. In addition, a third interface may provide the attribute of the event, the supplemental context data and the identity of the application to a server accessible by the application.

The system, method and article of manufacture disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a system, method, and article of manufacture of a smart device configured to determine higher-order context data. Although the present embodiments have been described with reference to specific example embodiments, it will be evident that various modifications and changes may be made to these embodiments without departing from the broader spirit and scope of the various claims.

Figure 1:
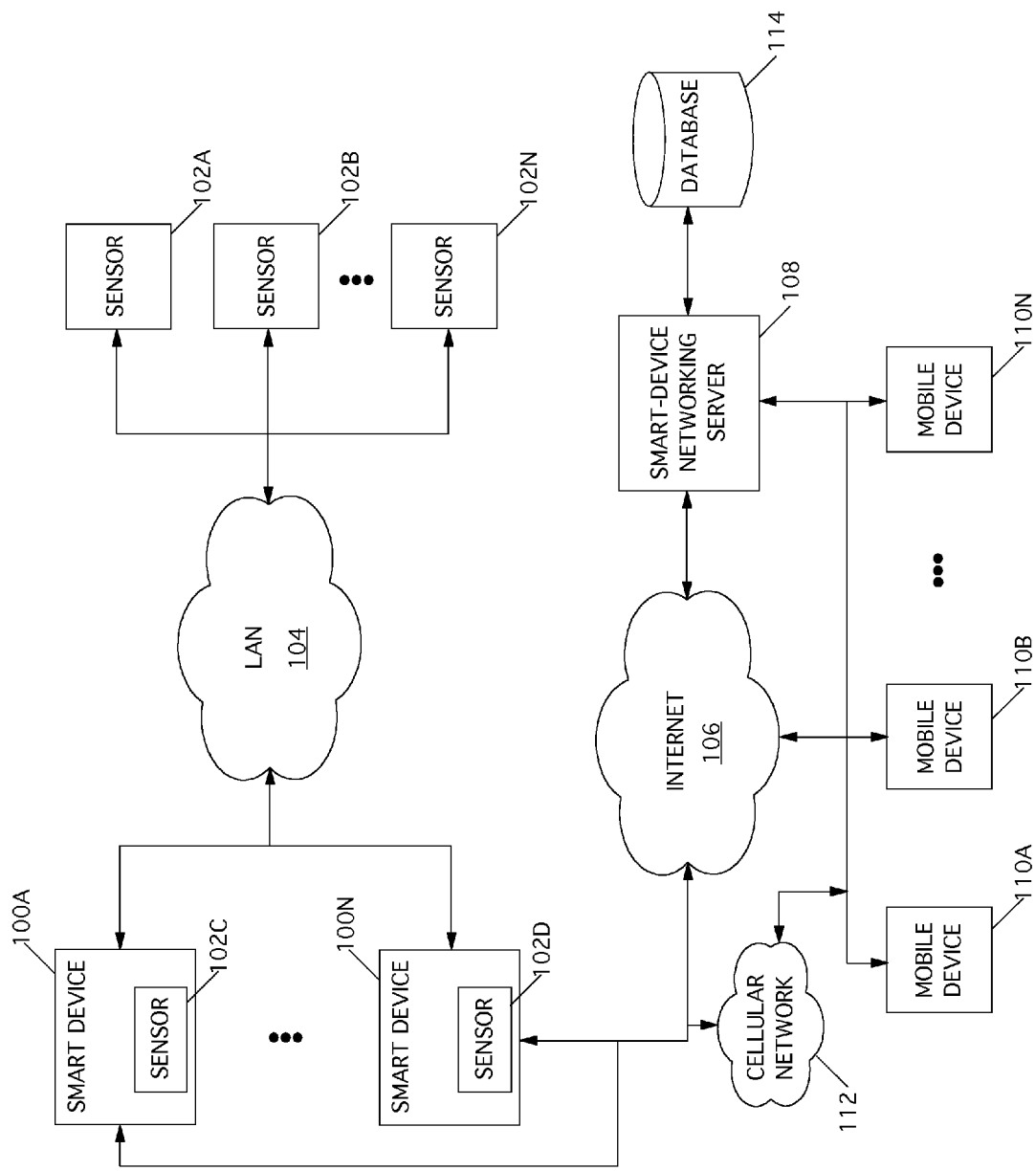
FIG. 1 is a block diagram illustrating the components of a computer network system that acquires, processes and communicates context data in accordance with one embodiment.

FIG. 1 is a block diagram illustrating the components of a computer network system that acquires, processes and communicates context data in accordance with one embodiment. As shown in FIG. 1, a set of smart devices 100 A-N and a set of sensors 102 A-N are communicatively coupled to each other with a local area network (LAN) 104. In an example embodiment, the LAN 104 may be implemented as a wireless LAN. The wireless LAN may link two or more devices using some wireless distribution method such as a spread-spectrum or orthogonal frequency-division multiplexing (OFDM) radio. In one example embodiment, the LAN may also provide an access point to the Internet 106.

The sensors 102 A-N may be either external or internal to the smart devices 100A-N. An example sensor 100A may measure a context data (e.g. context information, physical quantity). The sensors 102 A-N may then utilize a processor to convert the context attribute into an analog or digital signal including the context data. For example, the context data may provide information of an attribute of an event within the range of the sensor 102 A-N. In one example embodiment, a sensor 102 A-N may be a microsensor using microelectromechanical systems (MEMS) technology.

In another example embodiment, the sensor 102 A-N may utilize a radio-frequency identification (RFID) to transmit the signal including the context data to the smart device 100 A-N. An RFID tag may comprise at least two parts: an integrated circuit for storing and processing information, modulating and demodulating a radio-frequency signal, and other specialized functions. A second part includes an antenna for receiving and transmitting a signal. For example, if the context attribute represents a physical quantity, the sensor 100 A-N may measure the quantity (e.g. with a weight sensor). The sensor 100 A-N may then translate the physical quantity to an analog RFID signal. The analog RFID signal may represent the quantitative attributes of the physical quantity in a decodable form.

A sensor (e.g. 102 C and 102 D) may also be integrated into the smart device 100 A-N. In such a case, the sensor 102 C and 102 D may propagate a digital signal to the processor or memory of the smart device 100 A-N.

The sensor 102 A-N may include any device capable of measuring light, motion, temperature, a magnetic field, gravity, humidity, vibration, pressure, an electrical field, sound waves and other physical aspects of the external environment. The sensor 100A-N may also measure certain aspects of an electrical or mechanical device, such as internal temperature, the stretching of a material, motion of an object that includes the sensor and tensile force upon an appendage attached to the sensor. For example, the sensor 100A-N may measure the electrical or mechanical attributes of the electrical or mechanical device communicatively coupled with the sensor 100A-N. Examples of sensors 100A-N of the various embodiments include, inter alia, Global Positioning System (GPS) receivers, digital cameras, digital recorders, ambient light sensors, Bluetooth™ radio devices, temperature sensors, humidity sensors, pressure sensors (e.g. a barometric pressure sensor or a physical touch sensor), accelerometers, RFID readers, biosensors and chemical sensors. Further examples include a biosensor may measure environmental molecules, including toxins, nutrients or pheromones. In another example, a chemical sensor may measure (or detect) environmental chemicals or products of chemical reactions.

The smart-device 100 A-N may include a central processing unit (CPU), a random access memory (RAM) temporary storage of information, and a read only memory (ROM) for permanent storage of information. The smart-devices 100 A-N may be generally controlled and coordinated by operating system software. The operating system controls allocation of system resources and performs tasks such as processing, scheduling, memory management, networking, and I/O services, among other things. Furthermore, several context-data related applications may be resident in the smart devices 100 A-N memory and executed by the CPU. The operating system resident in the smart-devices 100 A-N memory and executed by the CPU may coordinate the operation of context-data related applications.

A smart device 100 A-N may receive a signal from at least one sensor 102 A-N. The smart device 100 A-N may decode and parse the signal into a computer-readable form. The smart device 100 A-N may analyze any context data derived from the signal. In one example, functionalities of the smart device 100 A-N may utilize the pre-programmed logic of the various context-data related applications to analyze the context data. The smart device 100 A-N may then encode and generate a message (e.g. a text message, a micro blog entry) that is configured for transmission via the Internet 106 and/or the cellular network 112. (For a description of various exemplar smart-device 100 A-N components and context-data related applications see the description of FIG. 2 infra).

The smart devices 102 A-N are communicatively coupled to the sensors as described supra. The smart devices 102 A-N may also be communicatively coupled to a cellular network 112 and/or the Internet 106. Data may be transferred to and from the various components of the computer network system of FIG. 1 via these networks using appropriate protocols. For example, an Internet protocol (IP) or other similar protocols may be utilized to communicate data between the smart devices 100A-N and the mobile devices 110A-N or the smart-device networking server 108 via the Internet 106.

The Internet 106 may be a collection of interconnected (public and/or private) networks that are linked together by a set of standard protocols (e.g. TCP/IP and HTTP) to form a global, distributed network. (While this term is intended to refer to what is now commonly known as the Internet 106, it is also intended to encompass variations that may be made in the future, including changes and additions to existing standard protocols.)

The cellular network 112 may be a radio network made up of a number of radio cells served by at least one fixed-location transceiver (e.g. a base station). A cellular network protocol may be utilized to transmit data via the cellular network 112. Exemplar protocols include, inter alia, a short message service (SMS) protocol; a Global System for Mobile communications standard such as a Multimedia Messaging Service (MMS) protocol and a Wireless Application Protocol (WAP). In one example embodiment, the cellular network 112 may utilize baseband technologies such as OFDM, multiple-input and multiple-output (MIMO), turbo codes, adaptive radio interfaces, spatial processing that includes multi-antenna and multi-user MIMO, fixed relay networks and multi-mode protocols. New networking technologies and protocols may be developed in the future that may be utilized by the computer networking system of FIG. 1.

The smart-device networking server 108 may include a central processing unit (CPU), a random access memory (RAM) temporary storage of information, and a read only memory (ROM) for permanent storage of information. The server 132 may be generally controlled and coordinated by operating system software. The operating system may control allocation of system resources and performs tasks such as processing, scheduling, memory management, networking, and I/O services, among things. Thus, in one embodiment, the operating system resident in smart-device networking server 108 memory and executed by CPU may coordinate the operation of the other elements of the computer networking system of FIG. 1.

The smart-device networking server 108 may include a web management system that propagates web pages in response to Hypertext Transfer Protocol (HTTP) requests from remote browsers (i.e. a web browser of the mobile device 110 A-N). The smart-device networking server 108 web management system may provide a graphical user interface (GUI) Web pages. For example, a web page sent to the mobile device 110 A-N may result in the display of a GUI screen. The web management system may include at least one hyperlink that provides access to other web pages including supplemental information about the context data and/or higher-order context data. The web management system and the analysis application 216 may be resident in the smart-device networking server 108 memory and executed by the CPU. In one embodiment, the smart-device networking server 108 may be capable of posting a microblog entry generated by a smart device 100A-N to a microblog website.

The smart-device networking server 108 may be coupled with a database 114. The database 114 may be provided, for example, as a database management system (DBMS), an object-oriented database management system (ODBMS), a relational database management system (e.g. DB2, ACCESS etc.) or another conventional database package. In one example embodiment, the database 114 can be implemented using object-oriented technology or via text files. For example, the database 114 may be accessed via a database computer language (e.g. Structured Query Language (SQL). Several categories of information are shown in this implementation of the database 114.

The smart-device networking server 108 may store context-data and other related data (e.g. sensor-related information and instructions, smart-device information and instructions, service subscriber information, previously determined higher-order context data). The other related data may also include pre-programmed analytic logic that may be uploaded to various smart devices 100 A-N such that the smart devices 100 A-N are remotely programmable by the smart-device networking server 108.

According to one embodiment, the mobile devices 110 A-N may be a portable computing device (e.g. a smart phone, a personal digital assistant) with a display screen and an input device (e.g. a touch screen, a miniature keyboard). In other embodiments, a personal computer, a laptop, a netbook or a server may be utilized in lieu of one or more of the mobile devices 110 A-N shown in FIG. 1. The mobile devices 110 A-N may be communicatively coupled with the cellular network 112 and/or the Internet 106. The mobile device 110 A-N may be capable of displaying a GUI screen (e.g. a web site, an MMS multimedia content) sent by the smart-device networking server 108. In one example embodiment, a mobile device 110 A-N may also function as a smart device 100 A-N. In another example embodiment, a mobile device 110 A-N may include a sensor 100 A-N.

Figure 2:
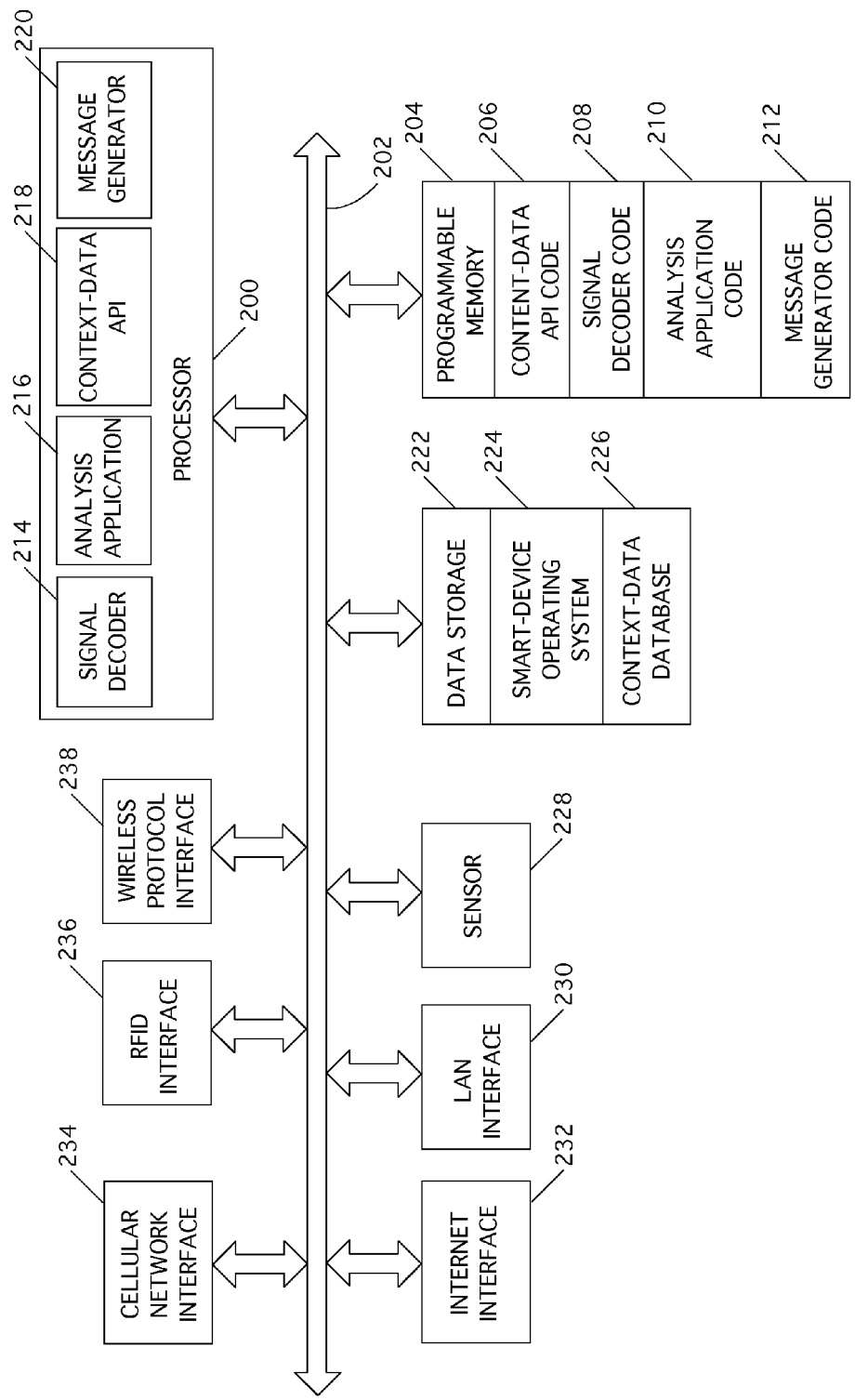
FIG. 2 illustrates certain component physical and logical structures of a smart device in accordance with one embodiment.

FIG. 2 illustrates certain component physical and code structures of a smart device 100 A-N, according to one embodiment. FIG. 2 includes a processor 200. The processor 200 is communicatively coupled to the other components of the smart device 100 A-N via the bus 202. The processor 200 is an electronic circuit that can execute computer programs. According to one embodiment, in active mode the processor 200 includes the signal decoder 214, the analysis application 216, the context-data API and the message generator 220. The signal decoder 214, the analysis application 216, the context-data API and the message generator 220 are shown as loaded into the processor 200 in order to perform their respective functions. In one embodiment, the signal decoder 214, the analysis application 216, the context-data API and the message generator 220 may be enabled as software functionalities. However, in other example embodiments, the signal decoder 214, the analysis application 216, the context-data API 218 and the message generator 220 may be enabled and operated using hardware circuitry, firmware, software or any combination of hardware, firmware, and software.

The source code for the context-data API 218 is located in the program memory 204 as the context-data API code 206. The source code for the signal decoder 214 is located in the program memory 204 as the signal decoder code 208. The source code for the analysis application 216 is located in the program memory 204 as the analysis application code 210. The source code for the message generator 220 is located in the program memory 204 as the message generator code 212. The program memory 204 may be a hard disk drive, flash driver or other memory device (either volatile or non-volatile).

In one embodiment, the analysis application 216 analyzes context data communicated by other smart devices 100 A-N and/or sensors 102 A-N. The analysis application 216 may also analyze higher-order context data communicated by the smart devices 100 A-N. The analysis application 216 may determine at least one type of context-data attribute from a signal. The analysis application 216 may then determine a higher-order context data from the determined context-data attribute(s). The context data may be a second order of data directly derived from an electrical signal propagated from a sensor (i.e. a first order of data). For example, the signal may be a particular voltage propagated by an electronic circuit of the sensor. A sensor processor may then convert the voltage directly to context data (e.g. with a processor register). By way of example, the context data may be limited to a direct mapping with the electronic signal. For example, a sensor processor may map an electronic signal of 1.5 mV propagated to a measured weight of 10 grams (i.e. the context data).

By way of example, a higher-order context data may be any data calculated with a particular algorithm that takes one or more context data as an input. The context data may originate from more than one sensor. The context data may also have been previously stored in the context-data database. The algorithm then outputs the higher-order context data. The value of the higher-order context data may be dependent on the value (s) of the input context data. Optionally, the higher-order context data may be calculated from a correlation of one or more context data. In other example embodiments, the algorithm used to calculate the higher-order context data may also take other previously calculated higher-order context data and/or preprogrammed parameter constants as input as well. In one embodiment, the analysis application 216 may determine higher-order "rule-based" behavior from the interaction of multiple sensors 100 A-N.

In one embodiment, the smart device 100 A-N may query an external server (e.g. the smart-device networking server 108 or a third-party server) via the Internet 106 to obtain additional relevant data to include in the context-data analysis performed by the analysis application 216. For example, in one embodiment, the smart device 100 A-N may utilize the wireless protocol interface 238, the LAN interface 230 and/or the Internet interface 232 to transmit the query to the smart-device network server 108. The query may interrogate a collection of data such as records in the smart-device networking server 108 or the database 114. The query may request a particular parameter relating to certain types of context data. For example, a smart device 100 A-N may query the smart-device networking server 108 in order to update a parameter relating to an allowable limit of a particular chemical compound measured by a sensor 102 A-N. Additionally, in one embodiment, the smart device 100 A-N may utilize the wireless protocol interface 238, the LAN interface and/or the Internet interface 232 to communicate other information to the smart-device network server 108 such as context data, a microblog post and a hyperlink to be embedded in an MMS message.

The cellular network interface 234 may include hardware circuitry, firmware, software or any combination of hardware, firmware, and software (e.g. a cellular network interface driver) configured to communicatively couple the smart device 100 A-N with the cellular network 112. For example, the smart device 100 A-N may utilize the cellular network interface 234 to transmit higher-order context data in SMS and MMS messages to the mobile devices 110 A-N. The RFID interface 236 may enable the smart device 100 A-N to receive RFID signals from an external sensor 102 A, B, E-N.

The data storage 222 may be a non-volatile data storage format (e.g. hard disk, flash memory). In one embodiment, the data storage 222 includes the data structures and files for the smart-object operating system 224 and a context-data database 226. The context-data database 226 may include an index of such data as context data, context-data parameters, appropriate pronouns to describe a single or association of smart devices, relationship types and past higher-order context-enriched data. The index may be implemented with a variety of data structures including, inter alia, balanced trees, B+ trees and hashes. In one embodiment, the smart device 100 A-N may include user input and output devices. The smart device 100 A-N may include a sensor 228 analogous to the sensors 102 B-C described supra.

Figure 3:
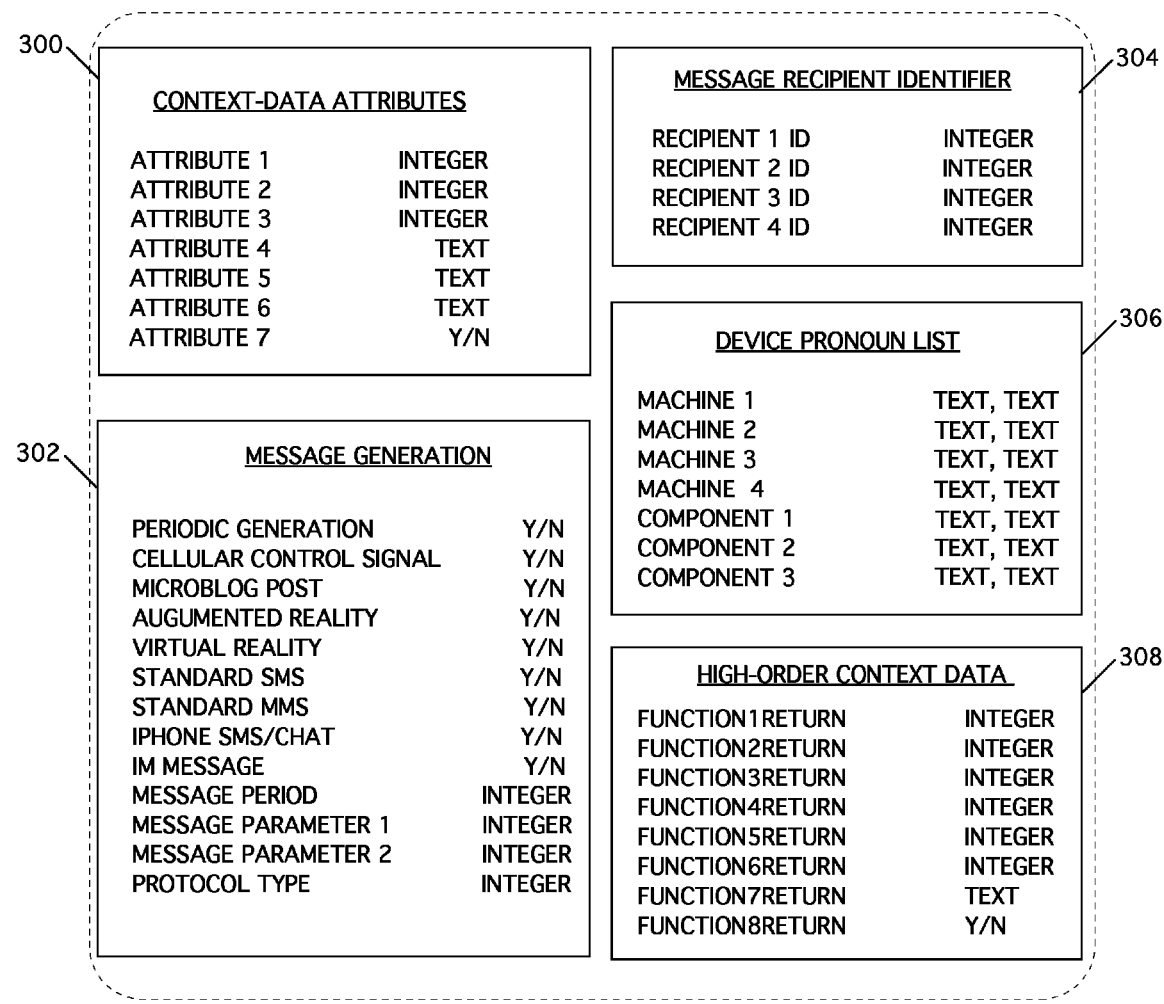
FIG. 3 shows a block diagram of one implementation of a context-data and higher-order context data database in accordance with one embodiment.

FIG. 3 shows a block diagram of one implementation of a context-data and higher-order context data database 226 in accordance with one embodiment. Several categories of data are shown in this implementation of the context-data database 226. These categories include context-data attributes data 300, message recipient identifier data 304, message generation data 302 and machine pronoun list data 306 and higher-order context data 308. The left column of each category comprises a list of elements that describe various attributes of context data, higher-order context data and the components of FIGS. 1 and 2, according to one embodiment. The right column of the category is a list of formats of the corresponding elements.

The context-data attributes data 300 may describe information about attributes of context data. The context-data attributes data 300 may be obtained from a signal comprising a context data. The signal may be propagated by a sensor 102 A-N. The context-data attributes data 300 may be comprised of one or more attributes of the context data (e.g. elements attribute1-attribute7). According to one embodiment, the attributes may have various formats (e.g. integer, text, y/n). For example, FIG. 3 illustrates attributes with integer, text and/or a yes or no state (e.g. a Boolean data type) values. In one embodiment, the analysis application 216 may include a functionality to identify the context-data and from a decoded signal. The analysis application 216 may then provide the appropriate attributes and attribute values to context-data database 226.

One example of a method of an analysis of context-data attributes is now provided. It should be noted that other embodiments may utilize other methodologies. The analysis application 216 may input the attributes into one or more functions. The analysis application 216 may then perform the functions. The results of the functions are the values of the formats of the higher-order context data category 308 elements. The results are stored as functionreturns (e.g. elements function1return-function8return). In this particular example, the functionreturns may have integer, text and/or a yes or no state values. In one embodiment, the functions and attributes may be graphically mapped in a particular type of mathematical space. The analysis application 216 may analyze the mapping to derive particular values or determine other functions. The results of the map analysis may also be stored as functionreturns in the higher-order context data category 308. The analysis application 216 may also compare a functionreturn value against a particular parameter to determine whether a particular operation should be performed. For example, if a particular functionreturn value is greater than equal to a particular integer, the analysis application 216 may then cause the message generator 220 to generate and transmit a particular message. The functionreturn values may also determine the identity of device to receive the message.

The message generator 220 may utilize the one or more functionreturn and/or attribute values to generate the message. The message generator 220 may utilize message generation data 302 to determine the type of message to generate (e.g. microblog post, augmented reality entity, virtual reality entity, standard SMS, iPhone SMS/chat, IM message, MMS, etc.). The message generation data 302 may also determine whether the message is repeatedly generated over a specified period or transmitted once. For example, if the periodic generation value is 'y' (e.g. a Boolean state of true) then the message will be repeatedly generated for the period defined by the message period integer. Various message parameters (e.g. message parameter1 and message parameter2) may determine such parameters of the message such as message length, text size, utilization of pronoun descriptions of smart devices and sensors or inclusion of hyperlinks. The message generator 220 may utilize the machine pronoun list category 306 to associate a particular pronoun with a particular smart device or sensor. For example, the message generator 220 may utilize the pronoun 'we' in an SMS text message if the message utilizes context data originating from two sensors and analyzed by a single smart device. On the other hand, the message generator 220 may utilize the pronoun 'I' if the context data originates from a sensor integrated into a smart device.

Figure 4:
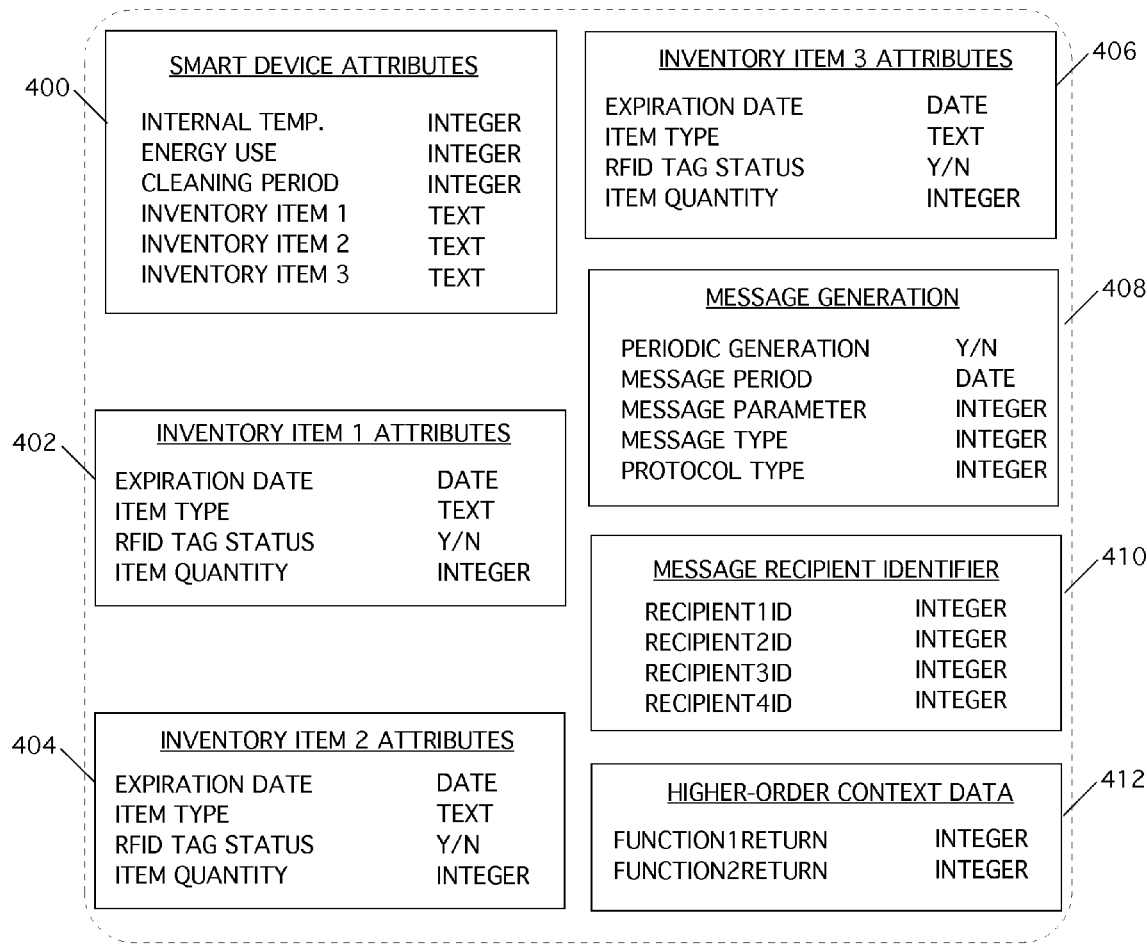
FIG. 4 shows a block diagram of one implementation of a context-data and higher-order context data database in accordance with another embodiment.

FIG. 4 shows a block diagram of an example of one implementation of a context-data and higher-order context data database 226 in accordance with another embodiment. Several categories of data are shown in this implementation of the context-data database 226. These categories include a smart device attributes category 400, an inventory item1 attributes category 402, an inventory item2 attributes category 404, an inventory item3 attributes category 406, a message generation category 408, a message recipient identifier 410 and a higher-order data context category 412. The RFID tags may also transmit the information of categories 402-406 to the smart device. The left column of each category comprises a list of elements that describe various attributes of the components of FIGS. 1 and 2, according to another embodiment. The right column of the category is a list of formats of the corresponding elements.

In this particular example, a smart device 100 A-N may be communicatively coupled with a refrigerator. The context-data base 226 may be configured specifically for utilization in the analysis of context data associated with the refrigerator. For example, the smart device attributes category 400 includes information obtained from the refrigerator (the values of elements internal temp., energy use, cleaning period). The smart device attributes category 400 also includes the identity of items stored in the refrigerator (inventory item1, inventory item2, inventory item3). The inventoried items may have RFID tags. The RFID tags may transmit the identity information if inventory items stored in the refrigerator to the smart device 100 A-N. Thus, the particular smart device of FIG. 4 may include a sensor configured to receive a RFID signal. The context-data signal decoder 214 of the particular smart device may be configured to decode and parse the RFID signal.

The RFID tags of the inventoried items may also provide additional information about the particular inventoried item. For example, if there are three inventoried items, this information may be included in the inventory item1 attributes 402, inventory item2 attributes 404 and the inventory item3 attributes 406 categories.

As in FIG. 3, the analysis application 216 may utilize the information in the inventory item1 attributes category 402, the inventory item2 attributes category 404, the inventory item3 attributes category 406 and the smart device attributes category 400 to determine the value of the higher-order context data of the functionreturn elements of the higher-order context data category 412. The message generator 220 may then utilize the information of the higher-order context data category 412, message generation category 408 and the message recipient identifier category 410 to generate and transmit a message to a particular mobile device 110 A-N.

For example, the analysis application 216 may apply a function to the value of the cleaning period attribute. The function may generate a value to the function1return attribute. The analysis application 216 may compare the function1return value to a parameter. The parameter may represent a period in which the refrigerator is to be cleaned. If the function1return value is greater or equal to the parameter, the message generator 220 may generate a message: "I need to be cleaned." The smart device may utilize this methodology to generate other messages. For example, if all the inventoried items have expired, the smart device may generate a message: "We have expired." In one embodiment, the RFID tag circuit may include an integrated circuit and a weight sensor. The weight sensor may determine the weight of the inventoried item. The integrated circuit may be configured to utilize the RFID tag to transmit a signal including the weight amount to the smart device if the weight amount is below a specified parameter. The weight amount may be stored in the item quantity attribute. The smart device may utilize the item quantity attribute to generate a message: "You need to buy more of me."

Figure 5:
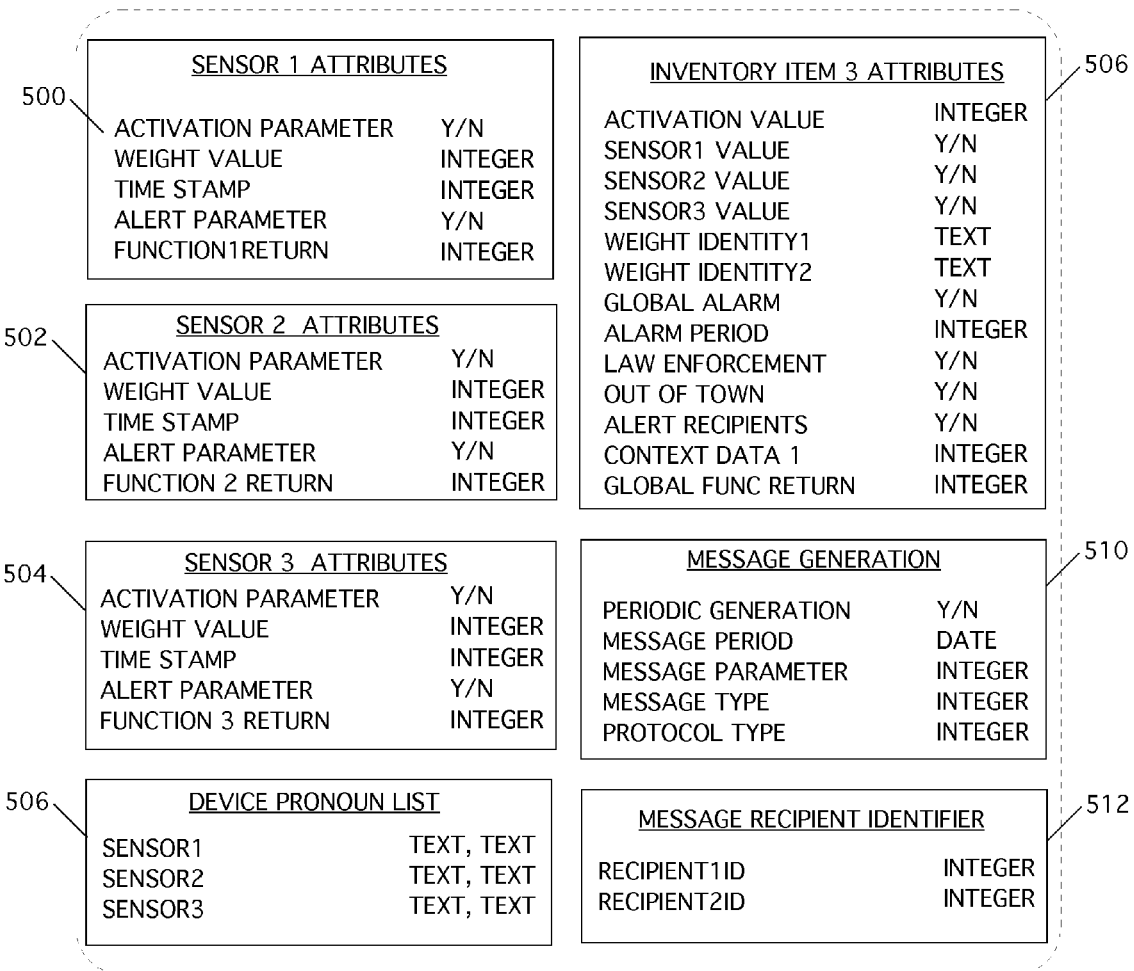
FIG. 5 shows a block diagram of one implementation of a context-data and higher-order context data database in accordance with yet another embodiment.

FIG. 5 shows a block diagram of an example of one implementation of a context-data and higher-order context data database 226 in accordance with yet another embodiment. Several categories of data are shown in this implementation of the context-data database 226. These categories include sensor1 attributes 500, sensor2 attributes 502, sensor3 attributes 504, device pronoun list 506, alarm system attributes 508, message generation 510 and message recipient identifier 512. The left column of each category comprises a list of elements that describe various attributes of the components of FIGS. 1 and 2, according to one embodiment. The right column of the category is a list of formats of the corresponding elements.

In this particular example, a smart device 100 A-N may be communicatively coupled with three weight sensors and an alarm system of a building with the wireless LAN 104. The weight sensors may be installed in the flooring of the building. The weight sensors may also be communicatively coupled with the alarm system via the wireless LAN 104. The weight sensors may transmit a measured weight to the smart device 100 A-N.

The analysis application 216 may input the attribute values of sensor1, sensor2 and sensor3 (i.e. activation parameters, weight value, time stamp, alert parameter) into a function in order to obtain a value for the particular functionreturn (i.e. function1return, function2return, function3return) of each sensor-related category 500-504. The analysis application 216 may then input the function1return, function2return and the function3return into another function to obtain the globalfunctionreturn return of the alarm system attributes category 508. The analysis application 216 may then compare the value of the globalfunctionreturn with the weight identity1 and the weight identity2 values of the alarm system attributes category 508. The weight identity1 and the weight identity2 values may represent parameters used to determine if the person whose weight was measured by the sensors is a validly present in the building during a time defined by the alarm period value. The globalfunctionreturn is not sufficient identical with either the weight identity1 or the weight identity2 an alarm message other operations may be initiated. For example, if the alert recipient's value is 'y' then a text message of "I have been broken into" may be generated by the message generator 220. The message may be transmitted to a device defined by the value of recipient1 id. If the out of town value is 'y', the message may be transmitted to another device defined by the value of recipient2 id. If the law enforcement value is 'y', the message may also be transmitted to a particular law enforcement entity. If the globalalarm value is 'y', the smart device may also communicate a microblog post to a particular website. The message generator 220 may utilize the values of the attributes of the message generation category 510 and the device pronoun list category 506 to generate the message. The smart device 100 A-N may also communicate the information in the context-data database 226 to the smart-device networking server 108. A user of a mobile device 110 A-N may be able to query the smart-device networking server 108 to obtain specific attribute values.

The examples provided by FIGS. 4 and 5 are intended to provide illustrations of particular implementations of various example embodiments. For example, in another embodiment, the systems and smart devices of FIGS. 1, 2 and 3 may be coupled with a traffic light system. The smart devices may analyze the operation of the traffic lights in the traffic light system. The smart devices may then determine a driving route based on the results of the analysis. The smart device may then transmit the driving route to a mobile device 110 A-N or post the driving route on a microblog website.

Figure 6:
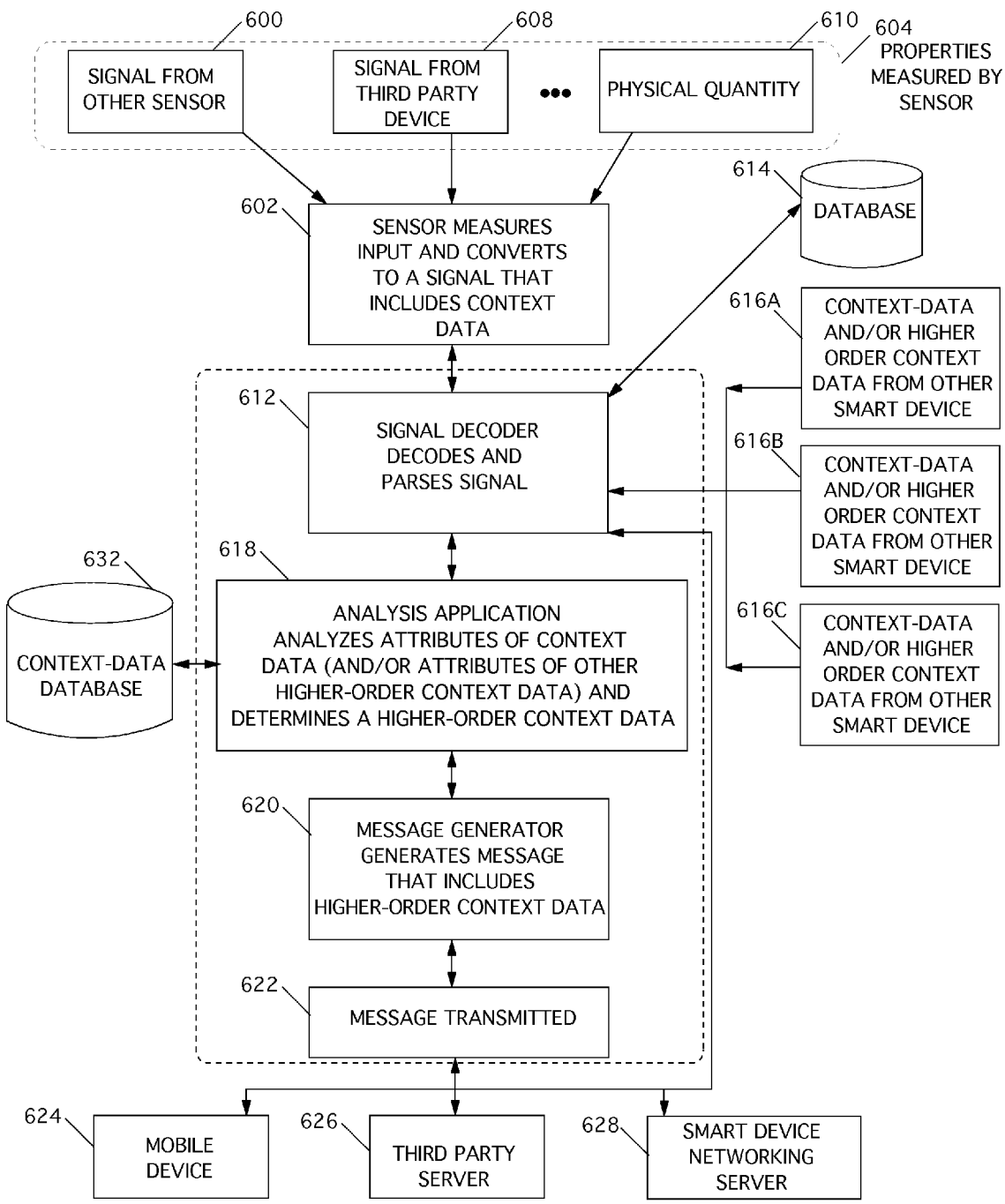
FIG. 6 illustrates the functioning of a smart device within a smart device network in accordance with one embodiment.

FIG. 6 illustrates the functioning of a smart device 600 within a smart device network such as the computer network system shown in FIG. 1, according to one embodiment. In operation 602, a sensor measures input from the properties measured by the sensor 604. Example measurable properties 605 include a signal from another sensor 606, a signal from a third-party device 608 and a physical quantity 610. In one example embodiment, the measured properties may represent context data. The sensor then converts the measured property to a signal that includes the context data. The signal including the context data is then transmitted to the smart device 600. In operation 612, the context-data signal decoder decodes and parses signals received by the smart device 600. Other data sources that transmit signals to the smart device 600 include data bases 615 (e.g. a third-party database), other smart devices that communicate other context data and other higher-order context data 616 A-N, a mobile device 624, a third-party server 626 and the smart-device networking server 628.

In operation 618, the analysis application 216 analyzes attributes of the context data (and/or attributes of the other higher-order context data). The analysis application 216 then determines a higher-order context data. The analysis application 216 may retrieve context-data attributes and other higher-order context data attributes from the data structures stored in the context-data database 630. In operation 620, the context message generator generates a message that includes the higher-order context data. The message is transmitted to at least one of the mobile device 624 (e.g. as an MMS message via a cellular network), the third-party server 626 (e.g. via the Internet) and the smart-device networking server 628 (e.g. via both the cellular network and the Internet).

Figure 7A:
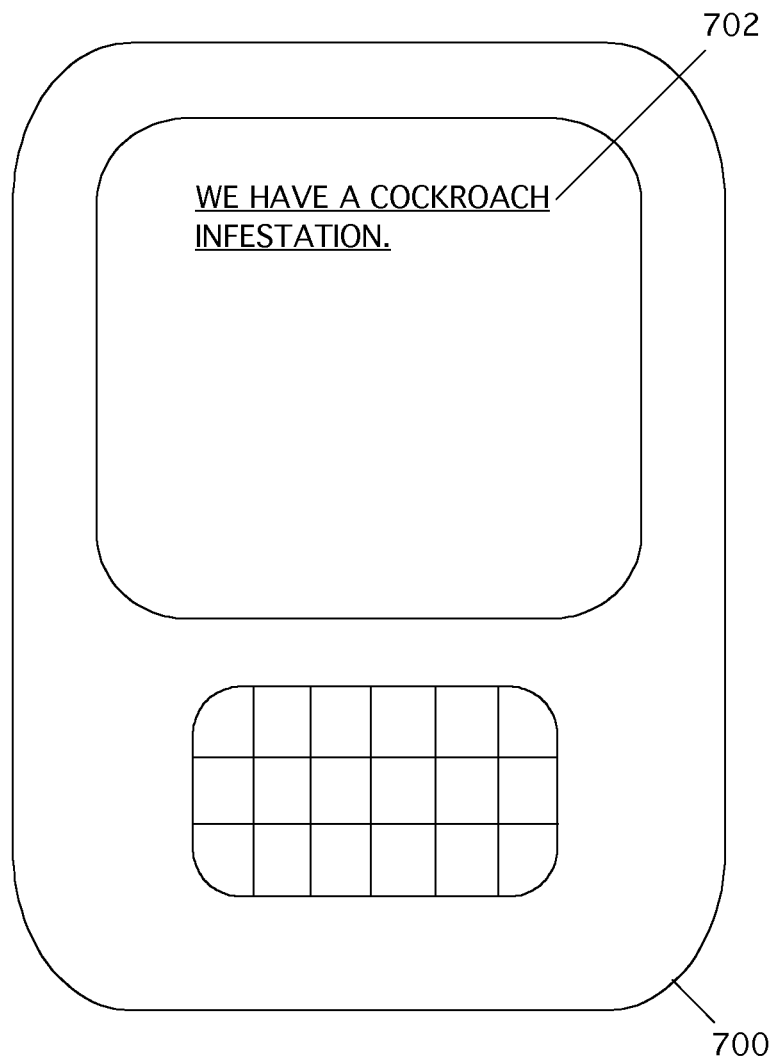
FIG. 7A shows a schematic diagram of a mobile device displaying a text message in accordance with an example embodiment.

FIG. 7A shows a schematic diagram of a mobile device displaying a hypertext message 702, according to an example embodiment. The mobile device 700 may be a portable computing device (e.g. a smart phone, a personal digital assistant) with a display screen and an input device (e.g. a touch screen, a miniature keyboard). The mobile device 700 may include a graphical user interface to display test messages. In other example embodiments, a personal computer, a laptop, a netbook or a server may be utilized in lieu of the mobile device 700. The hypertext message 702 may include a higher-order context data determined by the analysis application 216 of the smart device 100 A-N. The hypertext message 702 may include a hyperlink. The hyperlink of the hypertext message 702 may reference information stored in the data storage 222 of the smart device 100 A-N. The user may access the information referenced by the hyperlink by performing a specified operation (e.g. by a mouse click, touchscreen touch or a particular keypress sequence). In example embodiments, apart from running text, the hypertext message 702 may also contain tables, images and other presentational devices. The hypertext message 702 may be static (prepared and stored in advance) or dynamic (continually changing in response to user input).

For example, the hyperlink may access another hypertext that includes other information. The other hypertext may be provided in a variety of formats compatible with the functionality of the mobile device 700 (e.g. provided via a Web page, another text message or another microblog entry). The other hypertext may be generated by the smart device 100A-N in response to the user activating the hyperlink, see infra in description of FIG. 7B. In other example embodiments, the hypertext message 702 may also include non-hypertext text derived from context data acquired by the smart device 100 A-N (e.g. data acquired by the sensors) and/or third party information relevant to the subject matter of the content of the hypertext message 702.

Figure 7B:
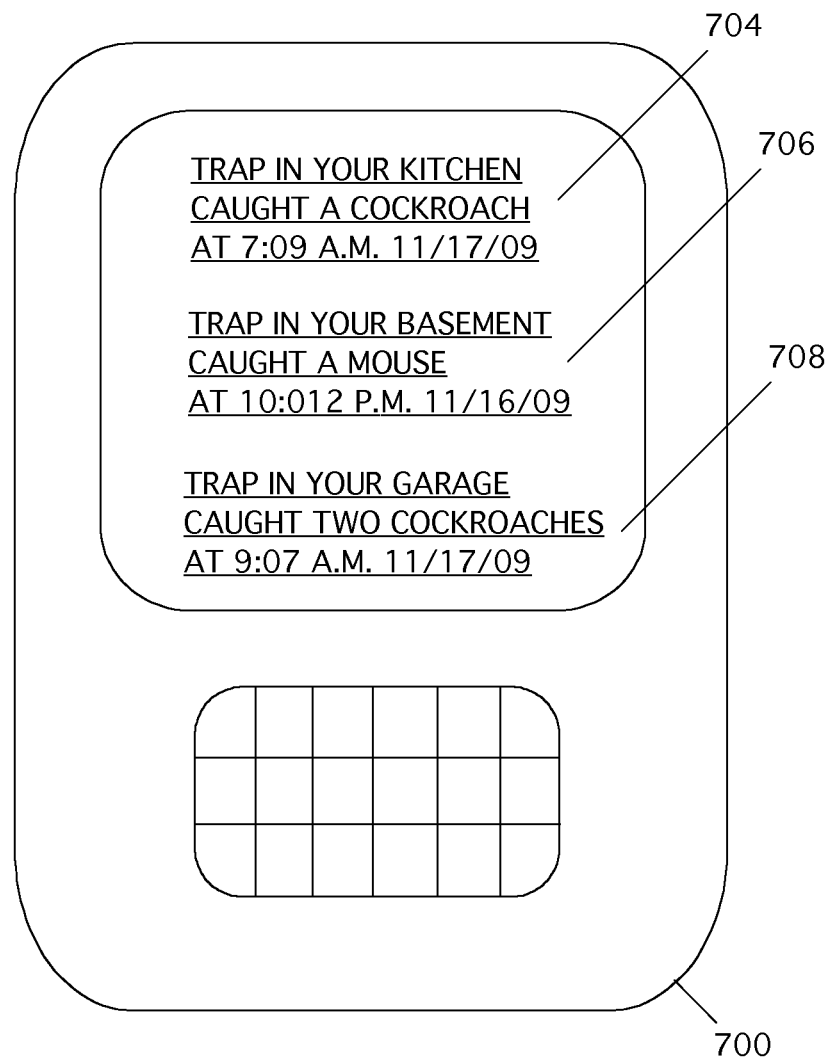
FIG. 7B shows a schematic diagram of the mobile device displaying a web page including additional information after the user accesses the hyperlink of FIG. 7A in accordance with an example embodiment.

FIG. 7B shows a schematic diagram of the mobile device 700 displaying a web page including additional information provided by the smart device 100 A-N after the user accesses the hyperlink 702 of FIG. 7A, according to an example embodiment. The additional information may be provided by the smart device 100 A-N. For example, the additional information may include context data (e.g. physical measurements acquired by the sensors 102 C and/or 102 D) utilized by the analysis application 216 to determine the higher-order context data displayed in FIG. 7A. The additional information may also include other higher-order context data provided by the analysis application 216. In one example embodiment, the smart device 100 A-N may include a web management system that propagates web pages in response to Hypertext Transfer Protocol (HTTP) requests from remote the mobile device 700. The smart device 100 A-N web management system may provide a graphical user interface (GUI) Web page as shown in FIG. 7B. For example, the web management system may be integrated with the message generator 220. Thus, the additional information may be rendered as text and/or hypertext 704, 706 and 708 on the GUI of the mobile device 700. The hypertext 704, 706 and 708 may include and/or access information referenced by hyperlinks. The hyperlinks may be accessed by performing a specified operation (e.g. by a mouse click, touchscreen touch or a particular keypress sequence). The hyperlinks may reference additional information stored in the data storage 222. Apart from running text, the hypertext 704, 706 and 708 may also contain tables, images and other presentational devices. The hypertext 704, 706 and 708 may be static (prepared and stored in advance) or dynamic (continually changing in response to user input). The hypertext 704, 706 and 708 may include a higher-order context data determined by the analysis application 216 of the smart device 100 A-N. In other example embodiments, the hypertext may 704, 706 and 708 may also include context data acquired by the sensors and/or third party information relevant to the subject matter of the content of the hypertext 704, 706 and 708.

Figure 7C:
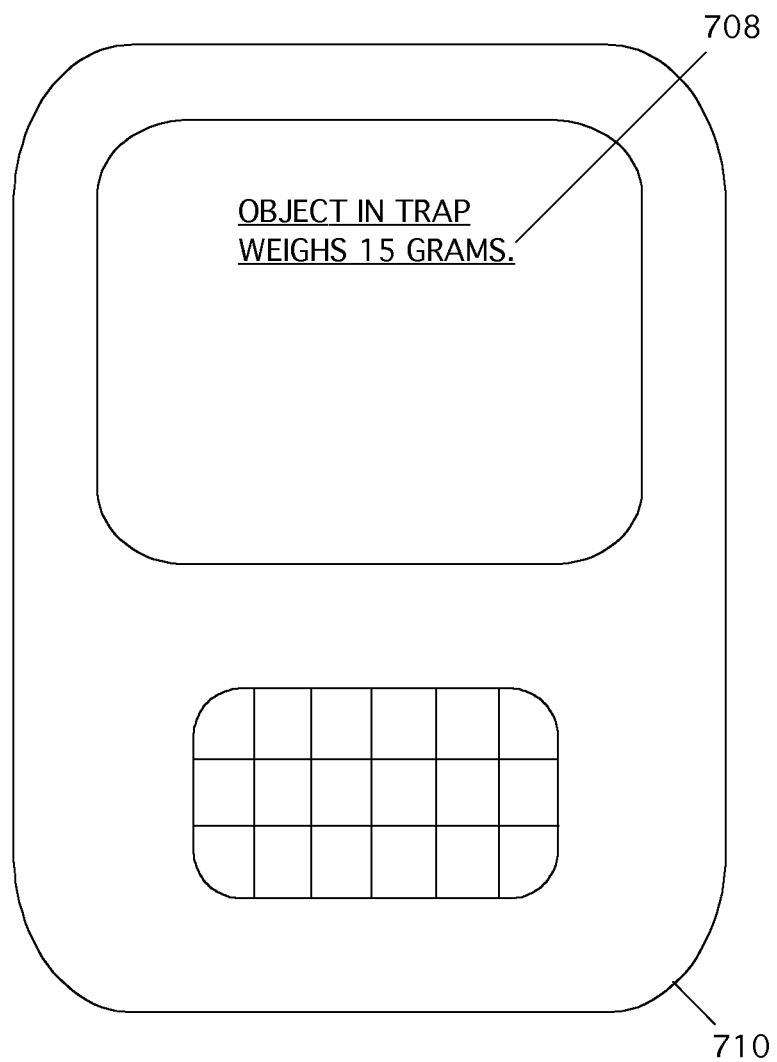
FIG. 7C shows a schematic diagram of the mobile device displaying a web page including additional information after the user accesses a hyperlink of FIG. 7B in accordance with an example embodiment.

FIG. 7C shows a schematic diagram of the mobile device 700 displaying a web page including additional information after the user accesses the hyper link 706 of FIG. 7B, according to an example embodiment. The text 708 includes information of a specific physical quantity measured by a sensor 102 A-N communicatively coupled to the smart device sensor 102 A-N. Thus, the example embodiment of FIGS. 7A-7C shows a sequence of operations with the user first presented with higher-order context data determined by the analysis application 216. The user is then able to utilize hyperlinks to directly access both other related higher-order context data and the context data utilized by the analysis application 216 to determine the various higher-order context data.

Although the present embodiments have been described with reference to specific example embodiments, various modifications and changes may be made to these embodiments without departing from the broader spirit and scope of the various embodiments. For example, the various devices, modules, etc. described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An apparatus comprising:
   a sensor configured to acquire a context data, wherein the context data provides information of an attribute of an event within the range of the sensor;
   a processor configured to analyze an attribute of the context data and determine a higher-order context data;
   a message generator configured to generate a supplemental context message transmittable through a network wherein the supplemental context message includes the higher-order context data, and wherein the supplemental context message comprises a text message identifying the apparatus with a pronoun; and
   a network interface device configured to communicatively couple the apparatus to the network, and
   wherein the context data originates from a radio transponder located in a food item container,
   wherein a signal from the radio transponder identifies at least one of an identity of a food item, an expiration date of the food item and a quantity of the food item in the food item container,
   wherein the processor determines that at the least one of the expiration date of the food item and the quantity of the food item in the food item container is beyond a certain threshold, and
   wherein the message generator generates a text message comprising a notification that the least one of the expiration date of the food item and the quantity of the food item in the food item container is beyond the certain threshold.

2. The apparatus of claim 1,
   wherein the signal from the radio transponder identifies a temperature of the food item, and
   wherein the processor determines that the appliance storing the food item container requires maintenance if a plurality of food items are above a specified temperature.

3. An apparatus comprising:
   a sensor configured to acquire a context data, wherein the context data provides information of an attribute of an event within the range of the sensor;
   a processor configured to analyze an attribute of the context data and determine a higher-order context data;
   a message generator configured to generate a supplemental context message transmittable through a network wherein the supplemental context message includes the higher-order context data, and wherein the supplemental context message comprises a text message identifying the apparatus with a pronoun; and
   a network interface device configured to communicatively couple the apparatus to the network, and
   wherein the apparatus is integrated into a traffic light system,
   wherein the sensor acquires a control signal of the traffic light system,
   wherein the process analyzes the control signal and determines the traffic light system is not functioning according to a set of predetermined parameters, and
   wherein the message generator generates an short message service (SMS) message notifying a traffic system administrator that the traffic signal is not functioning according to the set of predetermined parameters.

4. The apparatus of claim 3,
   wherein another processor analyzes a plurality of signals from a plurality of apparatuses and determines a set of malfunctioning traffic in a particular area,
   wherein the other processors create a route to navigate through the particular area and avoid the malfunctioning traffic lights, and
   wherein the message generator generates a target document comprising the route.

5. A set of application program interfaces embodied on a non-transitory computer-readable medium for execution on a computer in conjunction with an application program that provides a supplemental context data to an application comprising:
   a first interface that receives a status request from the application, wherein the status request comprises a query about an attribute of an event acquired by a sensor communicatively coupled with a processor running the set of application program interfaces;
   a second interlace that returns the supplemental context data comprising an interpretation of the attribute of the event to the application according to a communication standard utilized by the application, wherein the communication standard comprises a text messaging standard; and
   a third interface to provide the attribute of the event, the supplemental context data and the identity of the application to a server accessible by the application.

6. The set of application program interfaces of claim 5, wherein the supplemental context data comprises a hyperlink anchor to a target web document providing at least one of an additional information of the attribute of the event and an additional interpretation of the attribute of the event performed by the server.

7. A system for producing a supplemental context data signal comprising:
   a sensing device to acquire and decode a first signal comprising a first context data and a second context data, and wherein the sensing device comprises one or more environmental sensors that measure one or more attributes of a smart device;
   a processor to process the first signal in order to determine an interpretation of the first context data and the second context data and to provide an instruction to a signal generator to create a second signal comprising the interpretation of the first context data and the second context data; and
   a signal generator to create the second signal comprising the interpretation of the first context data and the second context data.

8. The system of claim 7, wherein the interpretation of the context data comprises a statistical analysis of a plurality of signals.

9. The system of claim 8, wherein the second signal comprises at least one of a text message and a microblog post.

10. The system of claim 9, wherein the text message refers to the system with a pronoun.

* * * * *